(12) United States Patent
Lee

(10) Patent No.: US 7,683,925 B2
(45) Date of Patent: Mar. 23, 2010

(54) MOBILE COMMUNICATION TERMINAL FOR TRANSMITTING/RECEIVING IMAGE DATA OVER GROUP COMMUNICATION NETWORK AND METHOD FOR TRANSMITTING/RECEIVING IMAGE DATA USING THE MOBILE COMMUNICATION TERMINAL

(75) Inventor: Dong Cheon Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1205 days.

(21) Appl. No.: 11/243,667

(22) Filed: Oct. 4, 2005

(65) Prior Publication Data

US 2006/0077996 A1    Apr. 13, 2006

(30) Foreign Application Priority Data

Oct. 4, 2004    (KR) .................. 10-2004-0078722

(51) Int. Cl.
*H04N 7/14* (2006.01)
*H04B 7/00* (2006.01)

(52) U.S. Cl. ............... 348/14.01; 348/14.02; 348/14.03

(58) Field of Classification Search ... 348/14.01–14.16; 370/352, 353, 356, 390, 312, 313, 328, 345, 370/340, 432, 342, 441; 455/517, 518, 519, 455/414.1, 414.3, 416
See application file for complete search history.

(56) References Cited

U.S. PATENT DOCUMENTS

| | | | |
|---|---|---|---|
| 5,231,492 A | 7/1993 | Dangi et al. | |
| 5,867,209 A * | 2/1999 | Irie et al. | 348/14.15 |
| 5,870,149 A | 2/1999 | Comroe et al. | |
| 2003/0043749 A1 * | 3/2003 | Tanaka et al. | 370/241 |
| 2003/0058827 A1 | 3/2003 | Chow et al. | |
| 2003/0157970 A1 * | 8/2003 | Kraft et al. | 455/566 |
| 2004/0057449 A1 * | 3/2004 | Black | 370/432 |
| 2005/0041035 A1 * | 2/2005 | Nagatomo et al. | 345/601 |

FOREIGN PATENT DOCUMENTS

| | | |
|---|---|---|
| CN | 1224295 | 5/2005 |
| GB | 2338150 | 8/1999 |
| JP | 08-204877 | 8/1996 |
| JP | 08-316953 | 11/1996 |
| KR | 1020040093530 A | 11/2004 |
| WO | WO 99/63773 | 12/1999 |
| WO | WO03/069926 | 8/2003 |
| WO | WO 2004/028112 A1 | 4/2004 |
| WO | 2004/056083 | 7/2004 |
| WO | WO2004/075581 | 9/2004 |
| WO | WO2004/084455 | 9/2004 |

* cited by examiner

*Primary Examiner*—Melur Ramakrishnaiah
(74) *Attorney, Agent, or Firm*—Lee, Hong, Degerman, Kang & Waimey

(57) ABSTRACT

A mobile communication terminal for transmitting/receiving image data over a group communication network includes: a push-to-talk (PTT) key for requesting a transmission right in a group communication mode; a vocoder for encoding a user voice signal received via a microphone; a memory for storing various image data; a controller for combining voice data received from the vocoder with the image data read from the memory to form a packet, or separating the image data from the received packet to perform an output control process; and a transceiver for transmitting packet data received from the controller to a group communication management center, or receiving the packet data from the group communication management center.

17 Claims, 8 Drawing Sheets

MOBILE COMMUNICATION TERMINAL FOR TRANSMITTING/RECEIVING IMAGE DATA OVER GROUP COMMUNICATION NETWORK AND METHOD FOR TRANSMITTING/RECEIVING IMAGE DATA USING THE MOBILE COMMUNICATION TERMINAL

This application claims the benefit of Korean Patent Application No. 10-2004-0078722, filed on Oct. 4, 2004, which is hereby incorporated by reference as if fully set forth herein.

BACKGROUND OF THE INVENTION

1. Field of the Invention

The present invention relates to a method for transmitting/receiving image data using a mobile communication terminal, and more particularly to a method for transmitting both image data and voice data in a group communication system capable of performing a push-to-talk function.

2. Discussion of the Related Art

Generally, a group communication system well known to the art as a point-to-multipoint (PTM) communication system or a push-to-talk (PTT) communication system is indicative of a system for allowing only one user, who has an exclusive transmission right during a predetermined time, to transmit desired information to other network members. Typically, the above-mentioned group communication system includes a plurality of transceivers, and the transceivers are tuned to the same frequency (i.e., the same channel). If a user, who has a transmission right and desires to send his or her voice signal to a called party, presses a PTT switch 110 positioned at one side of a mobile terminal 100 shown in FIG. 1, the mobile terminal 100 transmits the voice signal to the called party. If the user takes his or her finger off of the button 110, the mobile terminal 100 enters a reception mode. If there is a method for determining which one of persons will transmit the next message, predetermined users share the same frequency with one another.

FIG. 2 is a conceptual diagram illustrating a group communication system. Referring to FIG. 2, the group communication system includes a plurality of wireless telephones 211, 212, and 213, first and second base stations 221 and 222, and an Internet-, Intranet-, or Extranet server 230. The first wireless telephone 211 and the second wireless telephones 212 wirelessly communicate with the first base station 221. The first base station 221 communicates with the Internet-, Intranet- or Extranet server 230 over the Internet, the Intranet, or the Extranet. In fact, a large number of routers and other devices are included in the group communication system shown in FIG. 2. The third wireless telephone 213 wirelessly communicates with the second base station 222. The second base station 222 communicates with the Internet-, Intranet, or Extranet server 230 over the Internet, Intranet, or Extranet.

A communication scheme based on the above-mentioned group communication system provides a caller user and a called party with only a voice exchange service. Therefore, if there is a meeting of a certain group at a specific meeting place, the caller user may have difficulty in explaining the meeting place to the called party. In order to verbally explain the above-mentioned meeting place using the PTT service, most users must verbally explain the meeting place to their called parties several times.

Therefore, some users may frequently transmit a rough map including position information of the meeting place to their called parties. In this case, if raw data of the rough map image is transmitted to the called parties without any change, large amounts of data are created. Also, if a group communication caller user transmits an image configured in the form of a file, no problem occurs in the image transmission. Otherwise, if an image is drawn on a liquid crystal display (LCD) in real time, a changed part drawn by a caller user's handling must be checked by a specific device in real time, such that the specific device may have a complicated structure. As a result, an amount of load applied to a network is greatly increased, resulting in deterioration of call quality.

SUMMARY OF THE INVENTION

Accordingly, the present invention is directed to a mobile communication terminal for transmitting/receiving image data over a group communication network, and a method for transmitting/receiving image data using the mobile communication terminal that substantially obviate one or more problems due to limitations and disadvantages of the related art.

An object of the present invention is to provide a method and apparatus for performing a group communication function over a specific network, and at the same time transmitting correct position information to members of the same network.

Another object of the present invention is to provide a mobile communication terminal for performing a group communication function over a specific network, and at the same time transmitting voice and image data to members of the same network so as to enable the members to easily recognize a message of a caller user, and a method for transmitting/receiving data using the mobile communication terminal.

Another object of the present invention is to provide a mobile communication terminal capable of transmitting/receiving image data among a plurality of group communication members in real time without changing network load, and a method for transmitting/receiving data using the mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting/receiving image data over a group communication network using a mobile communication terminal, comprises the steps of: a) establishing a call setup process for performing group communication; b) combining, by a terminal of a caller user having a transmission right, image data with encoded voice data to form a packet, and transmitting the packet to a base station; and c) receiving the packet generated from the base station in a member terminal of the same network as the group communication network, separating the image data from the received packet, and displaying the image data simultaneously with outputting the voice data.

Preferably, the image data is formed by converting an image signal entered by the caller user of the terminal having the transmission right into code graphic data.

Preferably, the code graphic data is indicative of a meta file configured in the form of a script.

Preferably, the code graphic data includes only data of an image changed in real time.

Preferably, the code graphic data sets pre-defined figures to objects, and depicts operations for representing individual figures in the form of script data.

In another aspect of the present invention, there is provided a mobile communication terminal for transmitting/receiving image data over a group communication network, comprising: a push-to-talk (PTT) key for requesting a transmission right in a group communication mode; a vocoder for encoding a user voice signal received via a microphone; a memory for storing various image data; a controller for combining voice data received from the vocoder with the image data read from the memory to form a packet, or separating the image data from the received packet to perform an output control process; and a transceiver for transmitting packet data received from the controller to a group communication management center, or receiving the packet data from the group communication management center.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
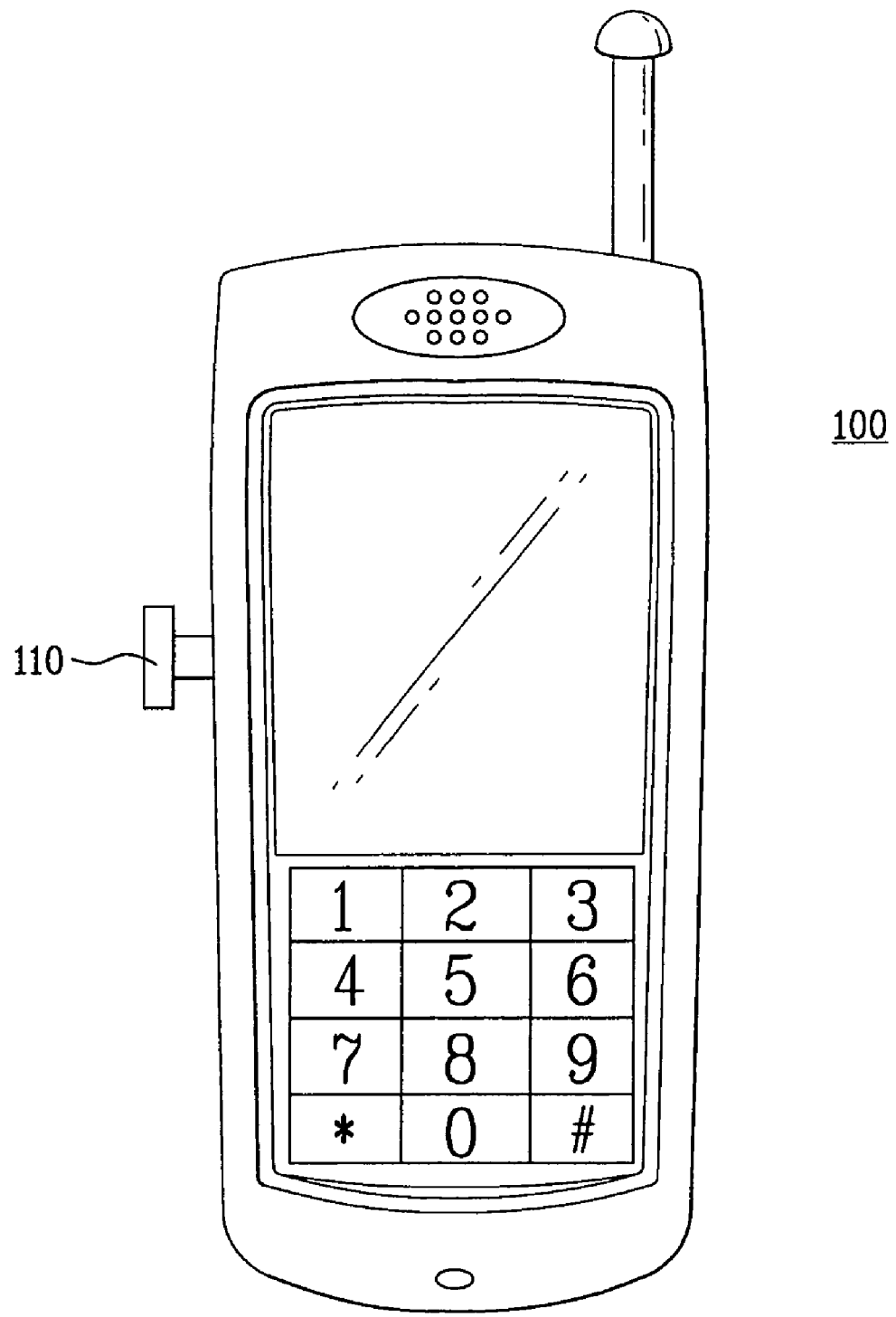
FIG. 1 shows the appearance of a PTT mobile terminal for use in group communication.
Figure 2:
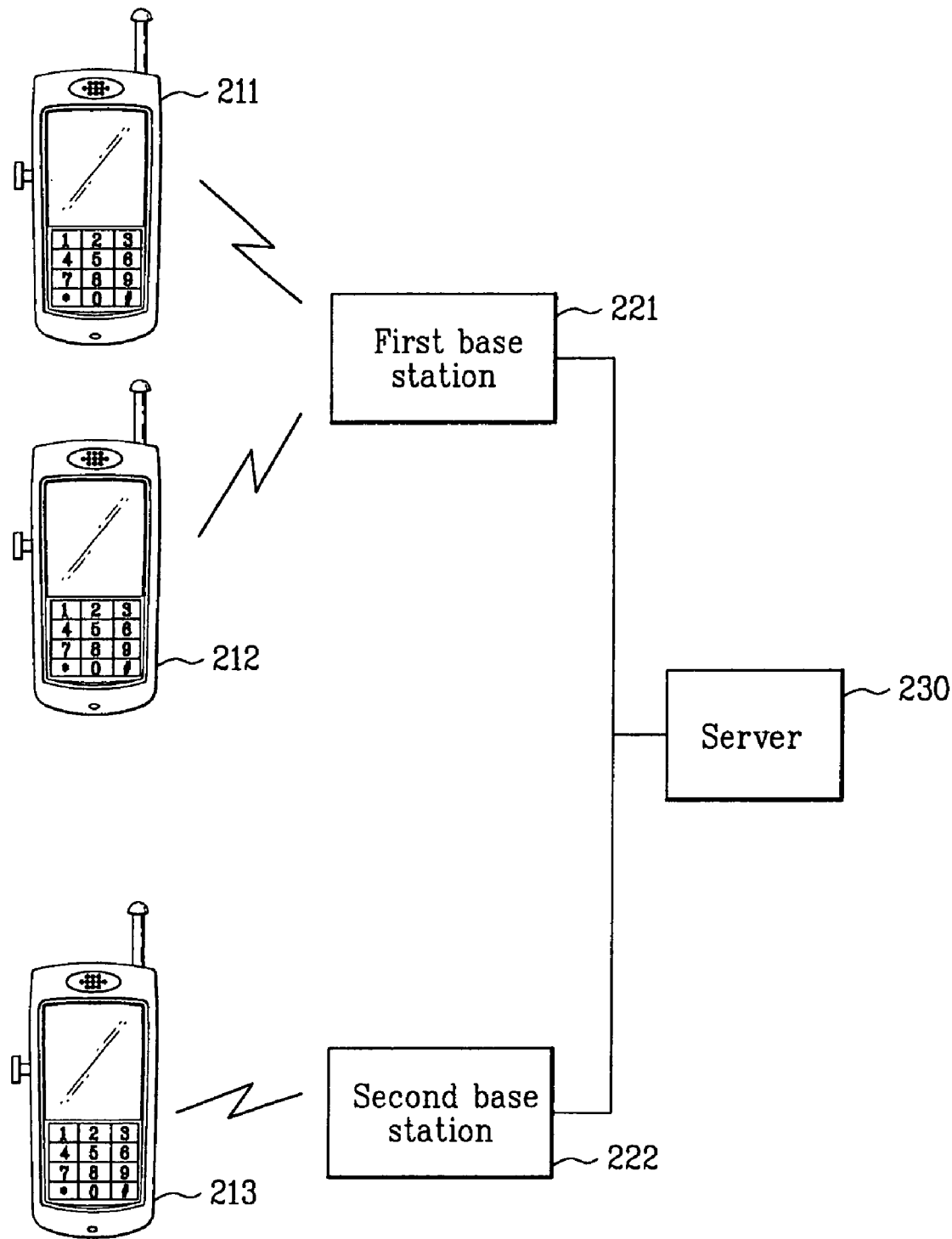
FIG. 2 is a conceptual diagram illustrating a system capable of performing group communication.
Figure 3:
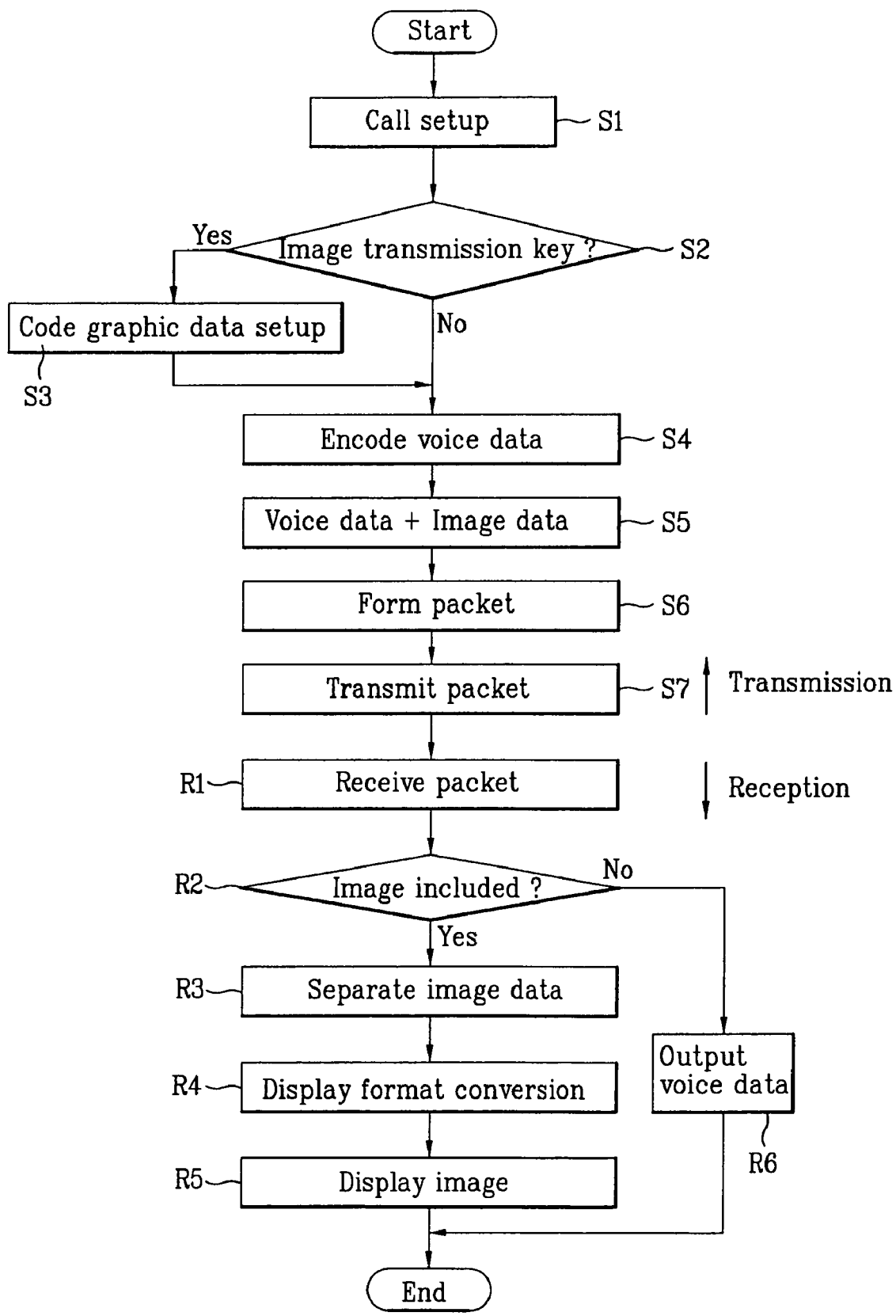
FIG. 3 is a flow chart illustrating an image transmission/reception method according to the present invention.

FIG. 3 is a flow chart illustrating a method for transmitting/receiving image data over a group communication network using a mobile communication terminal according to the present invention.

Referring to FIG. 3, a data communication method using a mobile communication terminal according to the present invention includes the steps of: a) establishing a call setup process for performing group communication; b) combining, by a terminal of a caller user having a transmission right, image data with encoded voice data to form a packet, and transmitting the packet to a base station; c) receiving the packet generated from the base station in a member terminal of the same network as the group communication network, separating the image data from the packet, and displaying the image data simultaneously with outputting the voice data.

Firstly, a call setup process is established to perform group communication among communication members contained in a predetermined group network, such that a group communication function is performed among the communication members at step S1.

In this case, if a user of a terminal having a transmission right presses a predetermined button to transmit image data at step S2, code graphic data is created on the basis of an input signal corresponding to the pressed button. Generally, most mobile communication terminals include a touch pad therein, such that most users prefer to draw a rough map instead of a detailed map using the touch pads of the mobile communication terminals. If a user desires to draw a rough map or simple picture for indicating a meeting place on his or her mobile communication terminal in a group communication mode, the user may combine predetermined figures with each other to draw a desired map or picture. In this case, it is assumed that the predetermined figures are referred to as objects, and operations for representing individual figures are pre-defined as follows.

Types of the above-mentioned objects are shown in the following Table 1, and definitions of the above-mentioned operations are shown in the following table 2:

TABLE 1

| OBJECT TYPES | OBJECT ID |
| --- | --- |
| Point | POINT (==0) |
| Straight line | LINE |
| Triangle | TRIANGLE |
| Rectangle | RECTANGLE |
| Circle | CIRCLE |

TABLE 2

| OPERATIONS | OPERATION ID | OPERATION PARAMETERS |
| --- | --- | --- |
| MOVE COORDINATES | MOVE (==0) | OBJ_ID, X, Y |
| DRAW | DRAW | OBJ_ID, X, Y, W, H, LC, FC |
| ERASE | ERASE | OBJ_ID |

Figure 4:
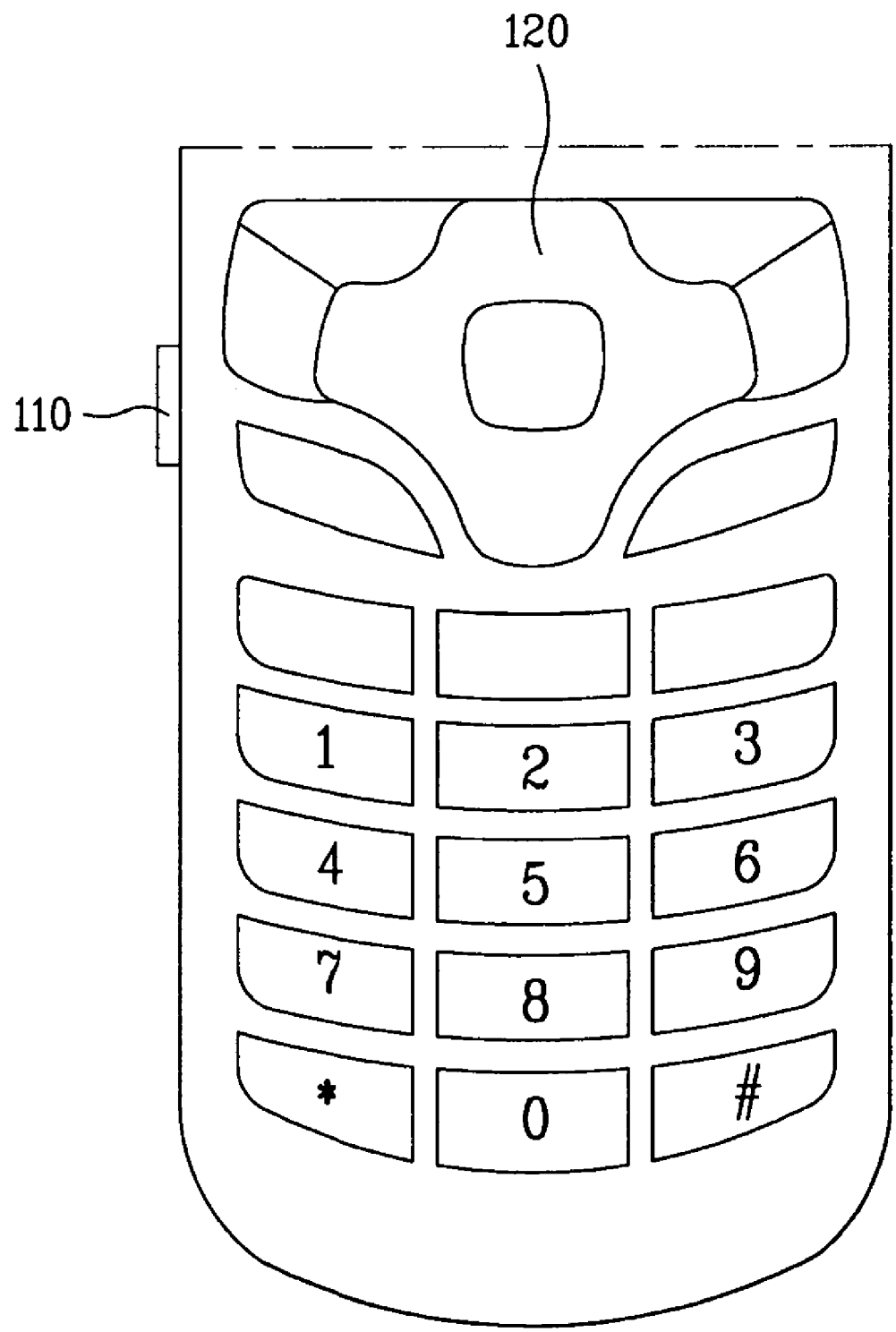
FIG. 4 shows the appearance of a mobile terminal capable of representing a figure using combination of a PTT switch and a navigation keypad according to a preferred embodiment of the present invention.

A user draws a desired figure using the PTT switch 110 with a navigation key 120 as shown in FIG. 4. When starting to draw the figure, the user moves a cursor to a desired drawing position using the navigation key 120. The user repeatedly presses the navigation key 120 simultaneously with pressing the PTT switch 110, such that the user draws a desired figure. Thereafter, if the desired figure is completed, the user takes his or her finger off of the PTT switch 110.

Created graphic data is depicted in the form of a meta file, instead of raw data. For example, a rectangle is depicted in the form of scripts, for example, DRAW (RECTANGLE, START_X, START_Y, WIDTH, HEIGHT, LINE_COLOR, AND FILE_COLOR). In this case, attributes of individual objects are pre-defined as shown in the following Table 3.

TABLE 3

| Attributes | ATTRIBUTE ID |
|---|---|
| Solid line | SOLID (==0) |
| Dotted line | DOTTED |
| Full | FULL |
| Empty | EMPTY |

If a desired figure is represented in the form of scripts, an amount of data to be stored can be greatly reduced, and only a changed part from among real-time image data must be depicted. Also, a part for checking the changed part can be easily implemented.

Figure 5A:
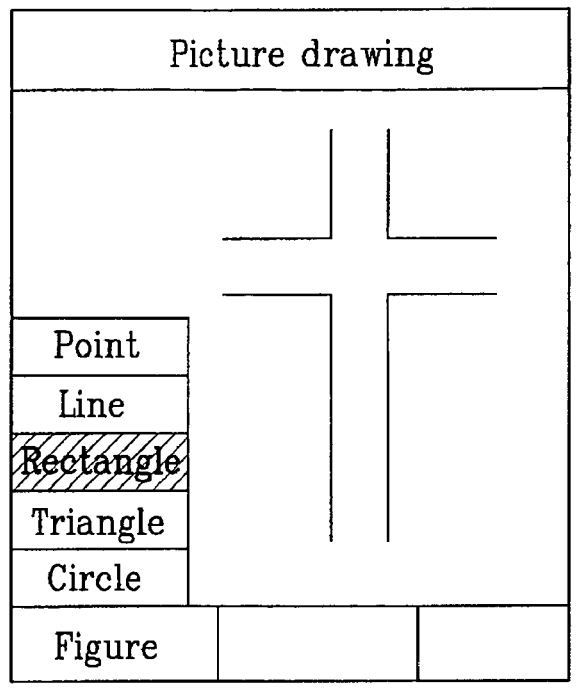
FIGS. 5A and 5B show picture-drawing examples depicted using a keypad according to the present invention.
Figure 5B:
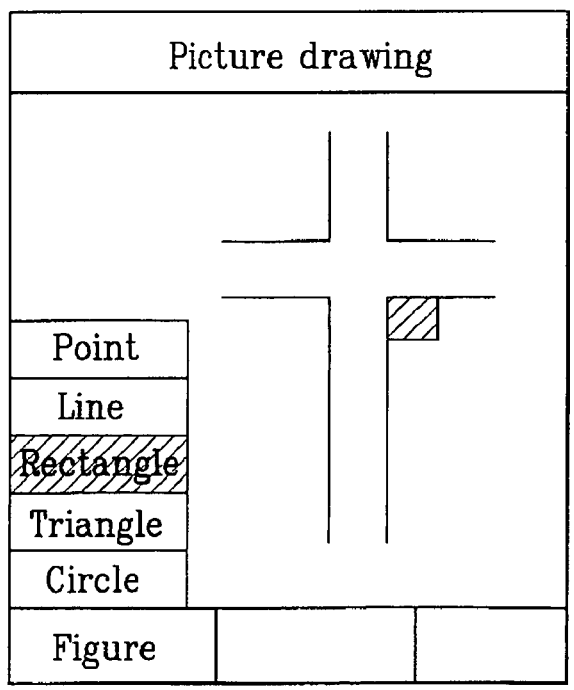

FIGS. 5A and 5B show picture-drawing examples depicted using a keypad according to the present invention. A user moves a cursor using the navigation key and keypad, and draws a desired figure. FIG. 5B shows a rectangle, differently from FIG. 5A. In other words, a difference between FIG. 5A and FIG. 5B is the presence of a rectangle. This difference is configured in the form of code graphic data to be formed at step S3.

If an image transmission key is not pressed by the user, only voice data is encoded at step S4. If the presence of image data to be transmitted is determined, the encoded voice data and the image data are combined at step S5, such that a packet is formed at step S6. If the absence of the image data to be transmitted is determined, the packet is formed using the encoded voice data at step S6. Thereafter, the packet is transmitted to terminals of individual group communication members via a Radio Frequency (RF) transmission/reception unit at step S7.

Terminals of other members contained in the above-mentioned group communication network receive the packet at step R1, and determine whether image data is contained in the received packet at step R2.

If a packet composed of only voice data other than the image data is received in the terminals of the other members, the terminals convert the voice data, and audibly output the converted result via a speaker at step R6.

Otherwise, if the packet includes the image data, the image data is separated from the packet at step R3. The separated image data is converted into a predetermined display format at step R4. The converted data is displayed on a liquid crystal display (LCD) of each terminal at step R5.

If a terminal user who acquires the opportunity of speaking draws a desired figure on an LCD of the terminal in real time, only a changed part from among the drawn figure is converted into code graphic data, and the code graphic data is transmitted to other users, such that an amount of transmission data is greatly reduced. In this case, a member terminal of the group communication network analyzes a received packet, updates a previously-drawn figure or picture according to the analyzed result, and displays the updated figure or picture.

According to the present invention, image data and voice data are combined, such that the combined data is transmitted to a receiver user. In this way, if the image data and the voice data are inserted into a single packet, transmission efficiency may be increased. If two data packets are divided into a voice data packet and an image data packet, and the voice data packet and the image data packet are separately transmitted to the receiver user, an RTP (Real-Time Protocol) header, a UDP (User Datagram Protocol) header, and an IP (Internet Protocol) header must be attached to individual packets, such that an amount of overhead is increased, resulting in ineffective transmission.

Figure 6:
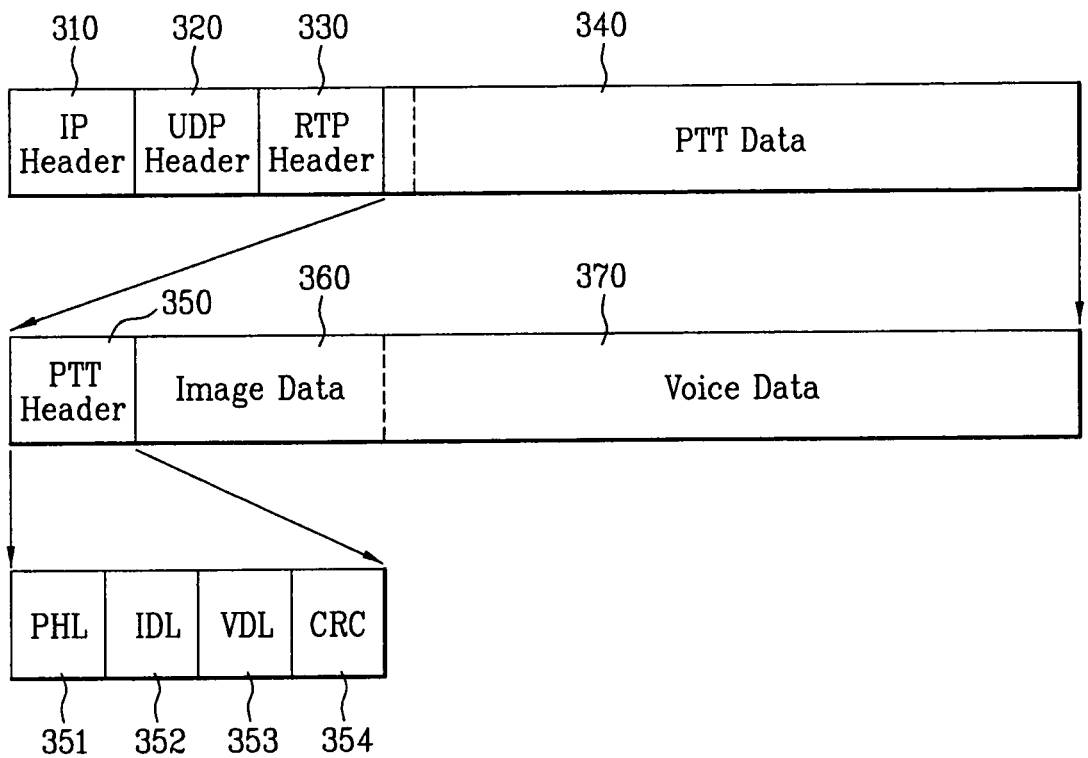
FIG. 6 is a structural diagram illustrating a packet for implementing a data communication method according to the present invention.

FIG. 6 is a structural diagram illustrating a packet for implementing a data communication method according to the present invention.

Referring to FIG. 6, the packet includes an IP header 310, a UDP header 320, an RTP header 330, and PTT data 340. The PTT data 340 includes a PTT header 350, image data 360, and voice data 370. The PTT header 350 includes a PTT header length value (PHL) 351, an image data length value (IDL) 352, a voice data length value (VDL) 353, and a CRC (Cyclic Redundancy Check) value of all PTT data including the PTT header (CRC) 354. The length value of the PTT header (PHL) is fixed to a predetermined value.

Figure 7:
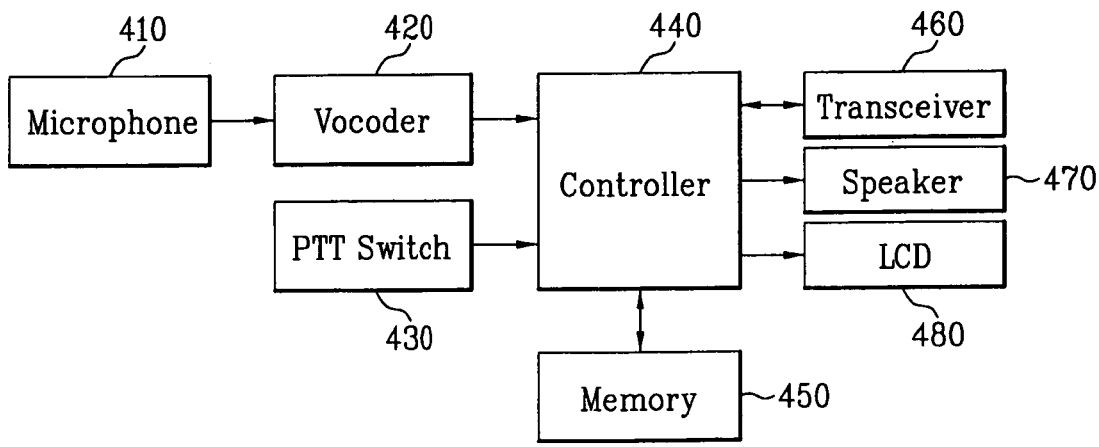
FIG. 7 is a block diagram illustrating a mobile communication terminal for implementing a data communication method according to the present invention.

FIG. 7 is a block diagram illustrating a mobile communication terminal for implementing a data communication method according to the present invention.

Referring to FIG. 7, the mobile communication terminal according to the present invention includes a vocoder 420 for coding a user voice signal received via a microphone 410; a PTT switch 430 for requesting a transmission right in a group communication mode; a memory 450 for storing image data; a controller 440 for combining voice data received from the vocoder 420 with image data read from the memory 450, and forming packet data according to the combined result; a transceiver 460 for transmitting the packet data received from the controller 440 to a group communication management center, or receiving the packet data from the group communication management center; a speaker 470 for audibly generating the voice data received from the controller 440; and an LCD 480 for displaying the image data received from the controller 440 to allow a user to visually recognize the image data.

For example, the above-mentioned image data according to the present invention is indicative of white image data and black image data. Upon receiving a permission signal from a bearer, the above-mentioned mobile communication terminal may transmit image data including many more colors to a receiver user. The image data is divided into several parts, each of which has a predetermined length, such that the several parts may be recorded in packet data. Otherwise, the several parts of the image data may also be temporarily stored in a buffer of a reception end as necessary.

Figure 8:
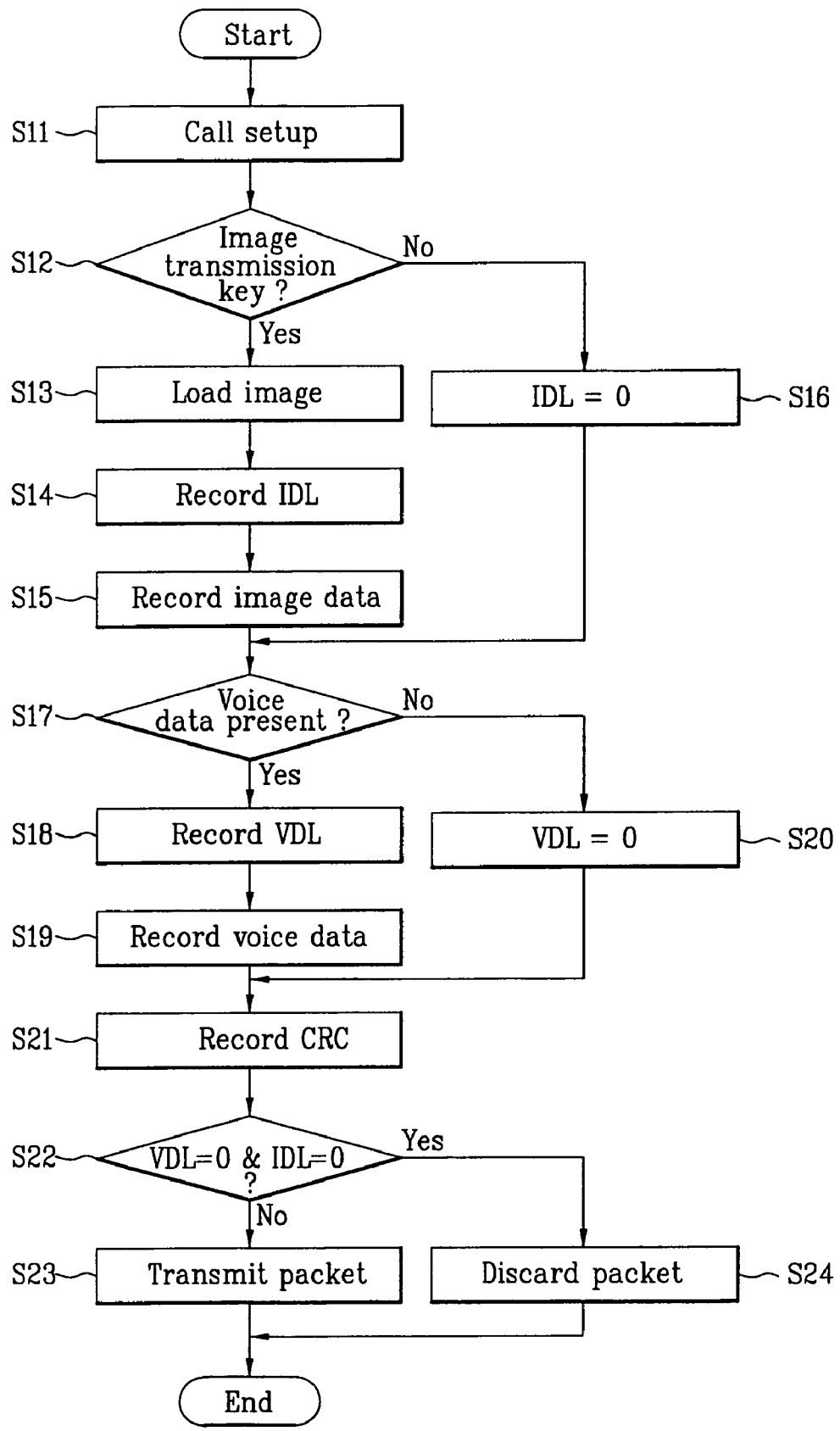
FIG. 8 is a flow chart illustrating a method for combining image data with voice data, and transmitting the combined result on the condition that a call setup process is established according to the present invention.

FIG. 8 is a flow chart illustrating a method for combining image data with voice data, and transmitting the combined result on the condition that a call setup process is established according to the present invention.

Referring to FIG. 8, a call setup process is performed to establish a group communication mode at step S11.

It is determined whether a control key for transmitting image data is entered during the group communication mode or a control command signal for transmitting the image data is detected during the group communication mode at step S12.

If the control command for requesting the execution of image data transmission is entered and there is image data to be transmitted, the mobile communication terminal reads the image data at step S13. The mobile communication terminal extracts size information of the image data from information of the image data, and records image data length information in the IDL (Image Data Length) area of the PTT header of a packet to be transmitted at step S14.

The mobile communication terminal divides the image data into a plurality of sub-data units, each of which has a predetermined length, such that the sub-data units are recorded in a data area of the packet. In this case, the image data may be stored as black/white image data in the data area, or may also be stored as color image data in the data area at step S15.

If there is no control command for image transmission, predetermined data of "0" is recorded in the IDL area. In this way, if the image transmission is currently performed, or no more image data remains due to transmission of all image data, the value of "0" is recorded in the IDL area. The value of "0" recorded in the IDL area can be easily used when a reception end separates desired image data from a received packet at step S16.

Thereafter, the presence or absence of voice data is determined. If a PTT caller user stops talking to a called party, the absence of voice data is determined. In this way, the mobile communication terminal determines the presence or absence of voice data while the PTT caller user who has a transmission right transmits image data at step S17.

If the presence of voice data to be transmitted is determined at step S17, size information of encoded voice data is stored in the VDL (Voice Data Length) area of the PTT header of the packet at step S18.

The mobile communication terminal stores the encoded voice data in the PTT data area other than the area storing the image data, such that a packet data area in which the image data and the voice data are combined is formed at step S19.

If the PTT caller user stops talking to a called party, the absence of voice data to be transmitted is determined. Therefore, the VDL area of the PTT header includes the value of "0" at step S20.

Therefore, the value of CRC associated with all PTT data including the PTT header is stored in the CRC area of the PTT header, such that a packet to be transmitted is completely formed at step S21.

The mobile communication terminal determines whether each of the VDL area and the IDL area store the value of "0" at step S22. If no voice data and no image data are determined, there is no data to be transmitted, such that a corresponding packet is discarded at step S24. Otherwise, if the presence of voice data or image data is determined, the mobile communication terminal transmits a packet in which voice data and image data are combined to other group members at step S23.

In order to prevent data from being transmitted to the outside of the group network according to PTT communication characteristics, a secure mode may be established. In this case, the mobile communication terminal may perform an additional control process for allowing the secure mode to be permitted or blocked by only a specific member as necessary.

Figure 9:
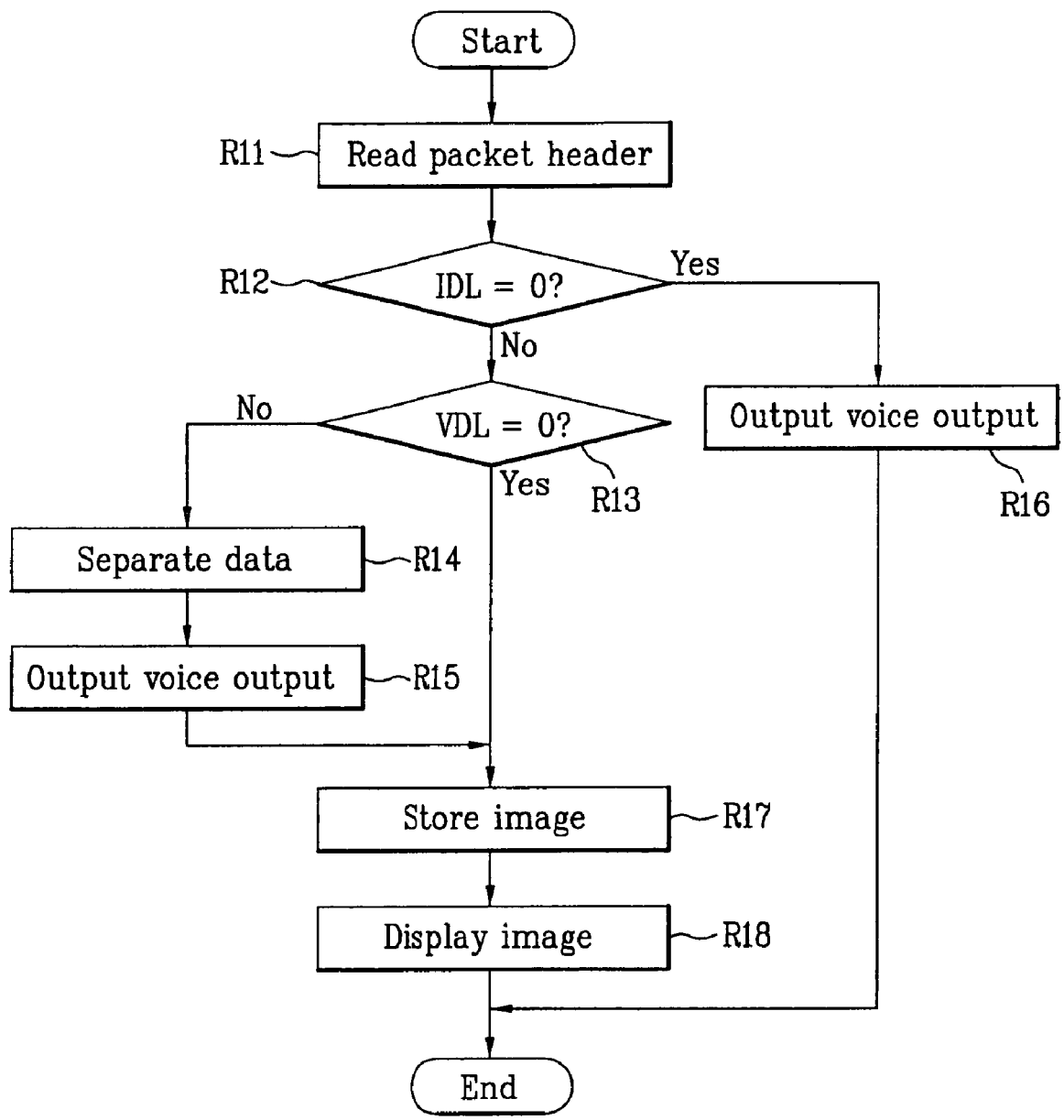
FIG. 9 is a flow chart illustrating a method for controlling mobile communication terminals of individual members contained in a group network to process their received packets according to the present invention.

FIG. 9 is a flow chart illustrating a method for controlling mobile communication terminals of individual members contained in a group network to process their received packets according to the present invention.

Referring to FIG. 9, individual member terminals, each of which receives a PTT communication packet from one member who has a transmission right from among a plurality of group members, read a header of a received packet at step R11. As previously stated above, the PTT header includes a PTT header length value (PHL), an image data length value (IDL), a voice data length value (VDL), and a CRC value. The header of the received packet is classified into three cases, for example, a first case in which image data and voice data are present in the header, a second case in which voice data is not present in the header whereas image data is present in the header, and a third case in which voice data is present in the header whereas image data is not present in the header. However, a fourth case in which image data and voice data are not present in the header is not generated. In other words, if no image data is stored in the IDL area and no voice data is stored in the VDL area (i.e., IDL=0 & VDL=0O) as previously stated in FIG. 5, a corresponding packet is discarded, such that the fourth case is not generated.

The mobile communication terminal determines whether the value of the IDL area is equal to the value of "0" at step R12. If it is determined that the value of IDL area is equal to the value of "0" at step R12, this case is determined to be the above-mentioned third case in which no image data is stored in the IDL area and only voice data is stored in the VDL area. In this case, the mobile communication terminal audibly outputs the voice data via a speaker at step R16.

In the meantime, if the mobile communication terminal determines whether the value of the IDL area is equal to the value of "0" at step R12, the first case or the second case may be established. Therefore, the mobile communication terminal determines whether voice data is stored in the VDL area. In other words, the mobile communication terminal determines whether the value of the VDL area is equal to the value of "0" at step R13.

If the first case in which voice data and image data are present in the received packet is established, the voice data must be outputted, such that the voice data is separated from the packet at step R14. Thereafter, the voice data is audibly outputted via a speaker at step R15.

However, if the second case in which no voice data is stored in the VDL area and only image data is stored in the IDL area is established, the image data is stored in the memory at step R17. Preferably, the image may be divided into sub-image units, each of which has a predetermined length, the sub-image units are transmitted to a receiver user. Preferably, the sub-image units are temporarily stored in the memory, and are then displayed at one time at step R18.

As apparent from the above description, the image transmission/reception method according to the present invention can transmit/receive image data among a plurality of group communication members in real time without changing network load, can transmit the image data along with voice data, and can transmit correct position information to members of the same network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting/receiving image data over a group communication network using a mobile communication terminal, the method comprising:

establishing a call setup process for group communication;

combining image data with encoded voice data to form a packet, wherein the image data is entered by using a navigation key while pushing a Push-to-Talk (PTT) switch for the group communication;

transmitting the packet from a calling terminal having a transmission right to a base station; and receiving the packet by a receiver that is a member terminal of the same network as the group communication network, wherein the receiver separates the image data from the received packet and displays the image data simultaneously while outputting the voice data.

2. The method according to claim 1, wherein the image data is formed by converting an image signal entered by a caller on the calling terminal into code graphic data.

3. The method according to claim 2, wherein the code graphic data includes only data of an image changed in real time.

4. The method according to claim 2, wherein the code graphic data is indicative of a meta file configured in the form of a script.

5. The method according to claim 4, wherein the meta file represents operations to depict a diagram pre-defined as an object.

6. The method according to claim 1, wherein the packet includes a Push-To-Talk (PTT) header,
wherein the PTT header comprises:
a PTT header length (PHL) value;
an image data length (IDL) value;
a voice data length (VDL) value; and
a cyclic redundancy check (CRC) value associated with all PTT data including the PTT header.

7. The method according to claim 1, wherein the packet is formed by the process comprising:
recording a header length of the packet;
recording a length of the image data;
recording the image data;
recording a length of the voice data;
recording the voice data; and
recording a cyclic redundancy check (CRC) value.

8. The method according to claim 1, wherein the image data is recorded after being divided into many sub-image data which has a predetermined length.

9. The method according to claim 1, wherein the transmitting the packet is implemented by a secure mode.

10. The method according to claim 1, wherein the receiving the packet comprises:
reading a header of the received packet;
separating the image data and the voice data from the received packet;
outputting the separated voice data via a speaker; and
displaying the separated image data on a display unit.

11. The method according to claim 10, wherein a received image packet is displayed on the display unit in real time whenever the image packet is received.

12. The method according to claim 10, wherein the receiving the packet further comprises temporarily storing the separated image data.

13. The method according to claim 1, wherein the mobile communication terminal is capable of being operated in a Code Division Multiple Access (CDMA) system.

14. The method according to claim 1, wherein the mobile communication terminal is capable of being operated in a Global System for Mobile communication (GSM) system.

15. A mobile communication terminal for transmitting/receiving image data over a group communication network, comprising:
a push-to-talk (PTT) switch for requesting a transmission right in a group communication mode;
a vocoder for encoding a user voice signal received via a microphone;
a memory for storing various image data, wherein the stored image data is entered by using a navigation key while pushing a Push-to-Talk (PTT) switch;
a controller for combining voice data received from the vocoder with the image data read from the memory to form a packet, or for separating the image data from the received packet to perform an output control process; and
a transceiver for transmitting packet data received from the controller to a group communication management center, or for receiving the packet data from the group communication management center.

16. The mobile communication terminal according to claim 15, wherein the mobile communication terminal is capable of being operated in a Code Division Multiple Access (CDMA) system.

17. The mobile communication terminal according to claim 15, wherein the mobile communication terminal is capable of being operated in a Global System for Mobile communication (GSM) system.

* * * * *